(12) United States Patent
Li et al.

(10) Patent No.: US 10,824,046 B2
(45) Date of Patent: Nov. 3, 2020

(54) METHOD FOR CONTROLLING SPECTRAL PROPERTIES OF OPTICAL QUANTUM STATES USING QUANTUM INTERFERENCE IN CASCADED WAVEGUIDE STRUCTURE

(71) Applicant: TIANJIN UNIVERSITY, Tianjin (CN)

(72) Inventors: Xiaoying Li, Tianjin (CN); Liang Cui, Tianjin (CN); Jie Su, Tianjin (CN); Jiamin Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/664,431

(22) Filed: Oct. 25, 2019

(65) Prior Publication Data

US 2020/0064709 A1 Feb. 27, 2020

Related U.S. Application Data

(63) Continuation of application No. PCT/CN2018/077374, filed on Feb. 27, 2018.

(30) Foreign Application Priority Data

Apr. 28, 2017 (CN) .......................... 2017 1 0300027
Jan. 25, 2018 (CN) .......................... 2018 1 0072595

(51) Int. Cl.
*G02F 1/35* (2006.01)
*G02F 1/39* (2006.01)

(52) U.S. Cl.
CPC .......... *G02F 1/3501* (2013.01); *G02F 1/3536* (2013.01); *G02F 1/395* (2013.01)

(58) Field of Classification Search
CPC ....... G02F 2001/3507; G02F 2001/392; G02F 1/3501; G02F 1/3536
See application file for complete search history.

(56) References Cited

U.S. PATENT DOCUMENTS 5,604,618 A * 2/1997 Mori ...................... G02F 1/3536
359/326
6,771,409 B2 * 8/2004 Huang .................... G02F 1/011
359/238

(Continued)

FOREIGN PATENT DOCUMENTS

CN 1888968 A 1/2007
CN 103091933 A 5/2013

(Continued)

OTHER PUBLICATIONS

Written Opinion for PCT/CN2018/077374.
International Search Report for PCT/CN2018/077374.

*Primary Examiner* — Rhonda S Peace
(74) *Attorney, Agent, or Firm* — Dragon Sun Law Firm, PC; Jinggao Li, Esq.

(57) ABSTRACT

The present invention discloses a method for controlling spectral properties of optical quantum states using quantum interference in cascaded waveguide structure comprises the following steps: adopting a multi-stage cascaded waveguide structure sequentially consisting of a segment of nonlinear medium, a segment of dispersive medium, . . . and a segment of nonlinear medium, or adopting a two-stage cascaded waveguide structure sequentially consisting of a segment of nonlinear medium, a segment of dispersion-controllable dispersive medium and a segment of nonlinear medium; pumping the multi-stage cascaded waveguide structure or two-stage cascaded waveguide structure by using pulsed laser to generate optical quantum states through the cascaded parametric process in the cascaded waveguide structure. The spectral property of the optical quantum state can be flexibly adjusted by changing the number of stages, the length and dispersion property of the dispersive media.

3 Claims, 11 Drawing Sheets

(56) References Cited

U.S. PATENT DOCUMENTS

| | | | |
|---|---|---|---|
| 6,867,903 B2* | 3/2005 | Imajuku | G02F 1/3517 |
| | | | 359/330 |
| 7,012,740 B2* | 3/2006 | Imajuku | G02F 1/3517 |
| | | | 359/330 |
| 8,228,507 B2* | 7/2012 | Hirano | B82Y 10/00 |
| | | | 356/450 |
| 2020/0064709 A1* | 2/2020 | Li | G02F 1/365 |

FOREIGN PATENT DOCUMENTS

| | | |
|---|---|---|
| CN | 103901700 A | 7/2014 |
| CN | 105511199 A | 4/2016 |
| CN | 10586 7046 A | 8/2016 |
| CN | 106289049 A | 1/2017 |
| CN | 106990641 A | 7/2017 |
| JP | 2013109088 A | 6/2013 |

\* cited by examiner

METHOD FOR CONTROLLING SPECTRAL PROPERTIES OF OPTICAL QUANTUM STATES USING QUANTUM INTERFERENCE IN CASCADED WAVEGUIDE STRUCTURE

CROSS-REFERENCE TO RELATED PATENT APPLICATION

This application is a bypass continuation application of PCT Application No. PCT/CN2018/077374. This application claims priority from PCT Application No. PCT/CN2018/077374, filed Feb. 27, 2018, CN Application No. 201710300027.6, filed Apr. 28, 2017 and CN Application No. 201810072595.X filed Jan. 28, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present invention belongs to the field of quantum information science and technology, and relates to the preparation of optical quantum states, such as quantum correlated photon pairs, entangled photons and single photons based on quantum correlated photon pairs, and quantum entanglements in continuous variables.

BACKGROUND OF THE INVENTION

The realization of many quantum information processing technologies depends on the availability of optical quantum states with well-defined spectral modes. The temporal modes and spectral modes are closely related to each other through Fourier transform. Spontaneous parametric process in nonlinear media is an effective method for preparing various optical quantum states, such as quantum correlated photon pairs and heralded single photons. Commonly used spontaneous parametric processes include spontaneous parametric down-conversion process in $\chi^{(2)}$ nonlinear media and spontaneous four-wave mixing process in $\chi^{(3)}$ nonlinear media. In such processes, one photon (two photons) from a strong pump light field is (are) annihilated through the $\chi^{(2)}(\chi^{(3)})$ nonlinear effect in the media and a pair of quantum correlated photon pairs with frequencies of $\omega_s$ and $\omega_i$, respectively, are generated, which are respectively referred to as the signal photon and the idler photon.

The spontaneous parametric process can be pumped either by a single-frequency continuous-wave laser or by a pulsed laser. Because the generation time of the optical quantum state is well-defined when using a pulsed laser, the synchronization required for realizing quantum interference between independent sources of optical quantum states can be easily satisfied. The quantum interference plays an important role in realizing quantum information processing tasks such as quantum computation and quantum entanglement swapping. The present invention is directed at the spontaneous parametric process pumped by a pulsed laser.

In the case of being pumped by a pulsed laser, the spectral mode property and collection efficiency are two important factors to characterize the quality of optical quantum states. In most applications, it is desired that the optical quantum state is in single spectral mode. To investigate the spectral mode property of the optical quantum states, we take the photon pairs generated from the parametric process as an example and start from the joint spectral function $F(\omega_s, \omega_i)$, which describes the spectral property of the photon pairs. $F(\omega_s, \omega_i)$ is proportional to the probability amplitude of generating a signal and idler photon pair with frequencies of $\omega_s$ and $\omega_i$ respectively. By performing Schmidt mode decomposition to the joint spectral function: $F(\omega_s, \omega_i) = \Sigma r_k \phi_k(\omega_s) \psi_k(\omega_i)(\Sigma r_k^2 = 1)$, the average mode number $$K = \frac{1}{\sum r_k^4}$$

of photon pairs can be obtained. The closer K is to 1, the closer the correlated photon pairs are to the single mode, that is, the closer the signal and idle photons are to the Fourier transform limit. In addition, in practice, the spectral mode property of correlated photon pairs can also be characterized by employing the second-order correlation function $g^{(2)}$ of signal or idler fields. Taking the signal field as an example, $g^{(2)}$ has the following relationship with the spectrum of correlated photon pairs:

$$g^{(2)} = 1 + \frac{\int\int d\omega_s d\omega'_s \left| \int d\omega_i f_s^*(\omega_s) F^*(\omega_s, \omega_i) f_s(\omega'_s) F(\omega'_s, \omega_i) \right|^2}{\left| \int\int d\omega_s d\omega_i |f_s(\omega_s) F(\omega_s, \omega_i)|^2 \right|^2} = 1 + r_k^4 \quad (1)$$

where $f_s(\omega_s)$ is the transmission spectrum of the optical filter applied in the signal photon channel. According to the Schwartz inequality, we always have $g^{(2)} \leq 2$. Generally, the closer the $g^{(2)}$ of the light field is to 2, the closer the spectral mode of correlated photon pairs is to the single mode.

The collection efficiency refers to the probability that both the signal and idler photons from one pair of photons generated in a nonlinear medium are collected after passing through their respective filters. If one or both of the photons are lost in the filtering and collecting processes, the coincidence counting rate of the correlated photon pairs (i.e., the counting rate of events that both the detectors of the signal photon channel and the idler photon channel simultaneously record photon detections) will decrease, which will affect the brightness and increase the background noise of the correlated photon pairs. The collection efficiency of correlated photon pairs can be characterized by the conditional collection efficiency of signal or idle photons. Taking the conditional collection efficiency $\eta_{s(i)}$ of signal (idler) photons as an example, which represents the probability of successfully collecting a signal (idler) photon given that its counterpart has already been collected. The conditional collection efficiency has the following relationship with the spectrum of the correlated photon pair:

$$\eta_{s(i)} = \frac{\int\int d\omega_s d\omega_i f_s(\omega_s) f_i(\omega_i) |F(\omega_s, \omega_i)|^2}{\int\int d\omega_s d\omega_i f_{i(s)}(\omega_{i(s)}) |F(\omega_s, \omega_i)|^2} \quad (2)$$

where $f_{s(i)}(\omega_{s(i)})$ denotes the transmission spectrum of the optical filters applied in the signal (idler) photon channel.

In many quantum information applications, the correlated photon pairs are required to not only have a single-mode property, but also have a high collection efficiency. However, for most bulk or waveguide nonlinear media, the joint spectral function of the associated photon pairs generated thereby cannot be directly decomposed into a product form, i.e., $F(\omega_s,\omega_i) \neq \phi(\omega_s)\psi(\omega_i)$. In this case, according to the Schmidt mode decomposition formula, the average mode number of the correlated photon pairs is greater than 1, so the photon pairs are in multi-mode.

In order to make the signal photons and idler photons generated through the spontaneous parametric process have a single spectral mode, the following two methods are commonly used. The first method is to use a narrowband filter to filter the signal photons and the idler photons, such that the coherence time of the filtered signal and idle photons is greater than the pulse width of the pump pulse. Generally speaking, the narrower the filter bandwidth is, the closer the photons are to the single mode. The second method is to engineer the dispersion of the nonlinear medium such that the joint spectral function can be decomposed directly. However, using the former method will result in the reduction of the collection efficiency. The narrower the filter bandwidth, the lower the collection efficiency. Although the latter method will not affect the brightness of the photon pairs, changing dispersion will affect the phase matching conditions, leading to complicated dependence of joint spectral function on dispersion, and all the factors have to be perfect to achieve the goal. Therefore, the latter method is limited to a specific wavelength range of operation due to strict requirement on dispersion and phase matching. Therefore, a heretofore unaddressed need exists in the art to address the aforementioned deficiencies and inadequacies.

SUMMARY OF THE INVENTION

The purpose of the present invention is to overcome the defects of the prior art and provide a method for controlling the spectral properties of optical quantum states by using quantum interference. The method controls the nonlinear interaction based on the quantum interference of multi-stage parametric process in cascaded waveguide structure consisting of nonlinear media and dispersive media. By using the cascaded waveguide structure, the phase matching of the parametric process and the engineering of the spectral property of the quantum states are separated, so the spectrum of the optical quantum state can be flexibly adjusted. The separation control process of this method is embodied in controlling the wavelength range of parametric processes by controlling the dispersion of the nonlinear medium; engineering the spectral properties of the optical quantum states by controlling the dispersion, length the dispersion media, and the number of stages. By using the present invention, a variety of optical quantum states can be prepared, including heralded single photons with pure state, polarization-entangled photon pairs, multi-channel pure state single photon, and quantum entanglements in continuous variables, etc. Compared with the method of obtaining spectral factorable optical quantum states by only engineering the dispersion properties of nonlinear media, the present invention has the advantages of simple process, flexible change of operating wavelength, and simultaneous multi-wavelength output; compared with the method of obtaining spectral factorable optical quantum states by using narrowband filtering, the photon pairs generated in the present invention have the advantages of high brightness. Moreover, because both the nonlinear media and dispersion media have waveguide structure, the generated optical quantum states will have well-defined spatial mode, and the multi-stage scheme can be easily implemented with high efficiency.

The purpose of the present invention is realized through the following technical solution:

A method for controlling spectral properties of optical quantum states using quantum interference in cascaded waveguide structure comprises the following steps: adopting a multi-stage cascaded waveguide structure sequentially consisting of a segment of nonlinear medium, a segment of dispersive medium, . . . and a segment of nonlinear medium, or adopting a two-stage cascaded waveguide structure sequentially consisting of a segment of nonlinear medium, a segment of dispersion-controllable dispersive medium and a segment of nonlinear medium, wherein the nonlinear medium and the dispersive medium in the multi-stage cascaded waveguide structure are sequentially and alternately arranged, and each segment of nonlinear medium is regarded as a stage, the number of stages of the multi-stage cascaded waveguide structure is greater than or equal to two; both the nonlinear media and dispersive media have waveguide structure; light waves can be incident from one end of the multi-stage cascaded waveguide structure or the two-stage cascaded waveguide structure and be emergent from the other end to form a light wave path;

pumping the multi-stage cascaded waveguide structure or two-stage cascaded waveguide structure by using pulsed laser to generate optical quantum states such as correlated photon pairs through a cascaded parametric process in the cascaded waveguide structure, wherein due to a quantum interference effect in the cascaded parametric process, the intensity of the optical quantum states experiences constructive or destructive interference at different wavelengths;

for the multi-stage cascaded waveguide structure, the wavelengths corresponding to constructive or destructive interference can be tuned by changing the number of stages of the multi-stage cascaded waveguide structure and the length of the dispersive medium or replacing the dispersive medium with different dispersion properties; for the two-stage cascaded waveguide structure, the wavelengths corresponding to constructive and destructive interference can be tuned by changing the dispersion properties and length of the dispersion-controllable medium;

filtering and collecting the optical quantum states at the wavelength corresponding to constructive interference by using filtering and collecting devices.

The nonlinear medium in the multi-stage cascaded waveguide structure or two-stage cascaded waveguide structure is a waveguide medium satisfying the phase matching conditions of the nonlinear parametric process; each segment of the nonlinear medium has the same or different dispersion properties, and when each segment of the nonlinear medium has different dispersion properties, it is required that the wavelength regions of optical quantum states generated through the parametric process in each segment of nonlinear medium are overlapped.

The dispersive medium in the multi-stage cascaded waveguide structure is a waveguide medium with dispersion; the dispersion-controllable medium in the two-stage cascaded waveguide structure is a waveguide medium or device with dispersion controllability.

Compared with the prior art, the technical solution of the present invention has the following beneficial effects:

(1) The present invention is based on the multi-stage cascaded waveguide structure sequentially consisting of nonlinear media and dispersive media through crossing (the number of stages of nonlinear media is greater than or equal to two), or a two-stage cascaded waveguide structure consisting of two nonlinear media and a dispersion controllable dispersive medium; optical quantum states are generated through the cascaded parametric process. The cascaded waveguide structure acts as active filtering device for the optical quantum states. Compared with the method which only uses a single segment of bulk or waveguide nonlinear medium, and uses passive filtering to improve the mode purity, using this method can improve the mode purity while maintaining the collection efficiency. Compared with the method of using dispersion-controllable nonlinear media (such as periodically poled nonlinear crystals or photonic crystal optical fibers), using this method can flexibly change the operating wavelength.

(2) In the present invention, for the optical quantum states output from the multi-stage cascaded waveguide structure, the spectral properties can be controlled by changing the number of stage of the cascaded structure and the length of the dispersive medium, or by replacing the dispersive medium with different dispersion properties.

(3) In the present invention, for the optical quantum states output from the two-stage cascaded waveguide structure containing a dispersion-controllable medium, the spectral properties of the optical quantum state can be controlled by changing the dispersion properties of the dispersion-controllable medium.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

FIG. 8 is a structural diagram of a correlated photon pair source based on cascade spontaneous parametric down-conversion in bulk crystals.

DETAILED DESCRIPTION

The present invention will be further described below with reference to the drawings. The present invention utilizes a pulsed laser pumped multi-stage cascaded waveguide structure (the number of stages is greater than or equal to two) or a two-stage cascaded waveguide structure containing a dispersion-controllable medium to obtain optical quantum states such as quantum correlated photon pairs through a cascaded optical parametric process. By changing the parameters of the cascaded waveguide structure and combining with a collecting and filtering device, the spectral properties of the correlated photon pairs can be controlled. Taking Gaussian pulse pumped spontaneous four-wave mixing parametric process in single-mode optical waveguide as an example, the spectral properties of photon pairs generated in the multi-stage cascaded waveguide structure (number of stages is greater than or equal to two) and the two-stage cascaded waveguide structure containing the dispersion-controllable medium in the present invention are described.

Firstly, for a nonlinear medium with uniform dispersion, the joint spectral function of the correlated photon pairs generated through the spontaneous four-wave mixing parametric process is as follows:

$$F(\omega_s, \omega_i) = \exp\left[-\frac{(\omega_s + \omega_i - 2\omega_p)^2}{4\sigma_p^2}\right] \times \mathrm{sinc}\left(\frac{\Delta kL}{2}\right) \exp\left(i\frac{\Delta kL}{2}\right) \quad (3)$$

i.e., the product of the pump envelope function exp $$\left[-\frac{(\omega_s + \omega_i - 2\omega_p)^2}{4\sigma_p^2}\right]$$

and the phase matching function sin c $$\left(\frac{\Delta kL}{2}\right)$$

exp $$\left(i\frac{\Delta kL}{2}\right),$$

where $\omega_p$ is the central frequency of the pump light, $\sigma_p$ is the bandwidth of the pump light, and the relationship between the wavelength and frequency of the signal and idle photon and the pump light is $\lambda_j=2\pi c/\omega_j$ (c represents the speed of light); L is the length of the nonlinear medium, $\Delta k=k_s+k_i-2k_p+2\gamma P_p$ is the phase mismatch; $k_p$, $k_s$ and $k_i$ respectively represent the propagation constants of pump, signal and idle photons, which are determined by the dispersion of the nonlinear medium, $\gamma$ represents the nonlinearity coefficient of the medium, and $P_p$ represents the peak power of the pump light.

Figure 1:
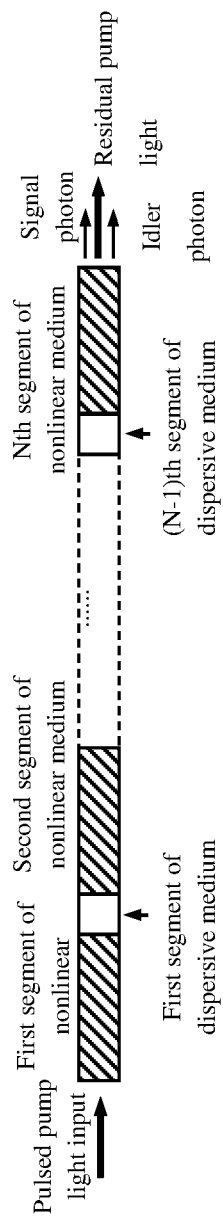
FIG. 1 is a schematic diagram of generating correlated photon pairs by using a spontaneous parametric process of pulse light pumping in a multi-stage cascade structure.

For the multi-stage cascaded waveguide structure in the present invention (the number of stages is greater than or equal to two), assuming that the number of stages is N, as illustrated in FIG. 1, the phase mismatch of the first segment of nonlinear medium with length $L_1$ is $\Delta k_1$, the phase mismatch of the $N^{th}$ segment of nonlinear medium with length $L_N$ is $\Delta k_N$, the phase mismatch of the first segment of dispersive medium with length $L_{d1}$ is $\Delta k_{d1}$ (here the phase mismatch of the dispersive media is defined as $\Delta k_d=k_s+k_i-2k_p$), the phase mismatch of the $(N-1)^{th}$ segment of dispersive medium with length $L_{d(N-1)}$ is $\Delta k_{d(N-1)}$, then the spectrum of correlated photon pairs output from the cascaded waveguide structure can be expressed as follows:

$$F_N(\omega_s, \omega_i) = \exp\left[-\frac{(\omega_s + \omega_i - 2\omega_p)^2}{4\sigma_p^2}\right] \times \left[\operatorname{sinc}\left(\frac{\Delta k_1 L_1}{2}\right)\exp\left(i\frac{\Delta k_1 L_1}{2}\right) + \right. \quad (4)$$

$$\operatorname{sinc}\left(\frac{\Delta k_2 L_2}{2}\right)\exp\left(i\Delta k_1 L_1 + i\Delta k_{d1} L_{d1} + i\frac{\Delta k_2 L_2}{2}\right) +$$

$$\ldots + \operatorname{sinc}\left(\frac{\Delta k_N L_N}{2}\right)\exp\left(i\Delta k_1 L_1 + i\Delta k_{d1} L_{d1} + \right.$$

$$\left.\left. \ldots i\Delta k_{N-1} L_{N-1} + i\Delta k_{d(N-1)} L_{d(N-1)} + i\frac{\Delta k_N L_N}{2}\right)\right]$$

where the meanings represented by other parameters in the above equation are respectively the same as that in equation (3).

If we further assume that the dispersion and length of each segment of nonlinear medium in the multi-stage cascade structure are the same, i.e., $\Delta k_1 = \Delta k_2 = \ldots = \Delta k_N = \Delta k_U$, $L_1 = L_2 = \ldots = L_N = L_U$, and the dispersion and length of each segment of dispersive medium are also the same, i.e., $\Delta k_{d1} = \ldots = \Delta k_{d(N-1)} = \Delta k_{dU}$, $L_{d1} = \ldots = L_{d(N-1)} = L_{dU}$, the joint spectral function of correlated photon pairs can be expressed as follows:

$$F_{NU}(\omega_s, \omega_i) = \quad (5)$$

$$\exp\left[-\frac{(\omega_s + \omega_i - 2\omega_p)^2}{4\sigma_p^2}\right] \times \operatorname{sinc}\left(\frac{\Delta k_U L_U}{2}\right)\exp\left(i\frac{\Delta k_U L_U}{2}\right) \times H(\theta)$$

where the meanings represented by other parameters in the above equation are respectively the same as that in equation (3), wherein $$H(\theta) = 1 + \sum e^{2in\theta} = \frac{\sin N\theta}{\sin \theta} e^{i(N-1)\theta} \quad (6)$$

here $\theta = \frac{1}{2}(\Delta k_U L_U + \Delta k_{dU} L_{dU})$. By comparing equations (3) and (6), it can be seen that, due to the phase-sensitive amplification effect of the latter segment of nonlinear medium on the output of the former segment of nonlinear medium, the joint spectrum of the output of the multi-stage cascaded waveguide structure is modified by the interference factor $H(\theta)$. It can be seen that the expression of the interference factor $H(\theta)$ is similar to that of the interference factor of the multi-slit interference.

For the two-stage cascaded waveguide structure based on the dispersion-controllable medium in the present invention, the number of stages is N=2. According to equation (4), the spectrum of the correlated photon pairs output thereby can be expressed as follows:

$$F_2(\omega_s, \omega_i) = \exp\left[-\frac{(\omega_s + \omega_i - 2\omega_p)^2}{4\sigma_p^2}\right] \times \left[\operatorname{sinc}\left(\frac{\Delta k_1 L_1}{2}\right)\exp\left(i\frac{\Delta k_1 L_1}{2}\right) + \right. \quad (7)$$

$$\left.\operatorname{sinc}\left(\frac{\Delta k_2 L_2}{2}\right)\exp\left(i\frac{\Delta k_2 L_2}{2} + i\Delta k_1 L_1 + i\Phi_d\right)\right]$$

wherein, $\Phi_d = \phi_s + \phi_i - 2\phi_p$ is the phase difference between the signal and idler photons and the pump photons introduced by the dispersion-controllable medium. By controlling the dispersion-controllable medium, $\Phi_d$ at each phase matched wavelength can be tuned individually or wholly, so as to realize the control of the joint spectrum of correlated photon pairs.

Figure 2:
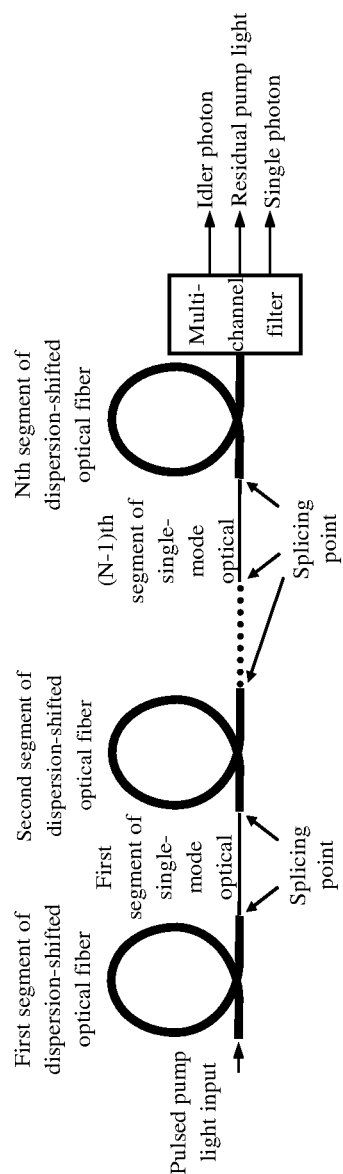
FIG. 2 is a schematic diagram of generating correlated photon pairs by using a multi-stage cascade structure based on dispersion-shifted optical fibers and single-mode optical fibers.
Figure 3A:
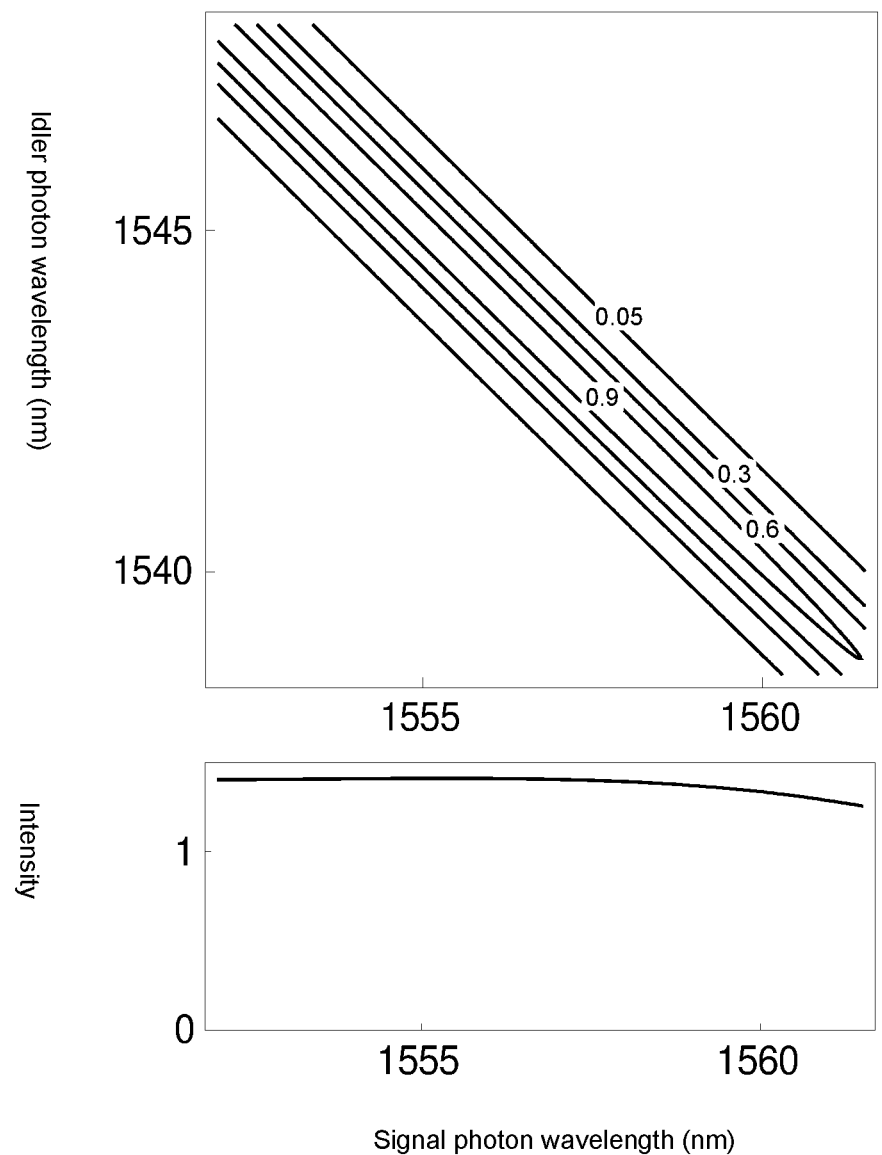
FIG. 3 (a) to FIG. 3 (d) are spectra simulation result charts of correlated photon pairs generated by a multi-stage cascade structure.
Figure 3B:
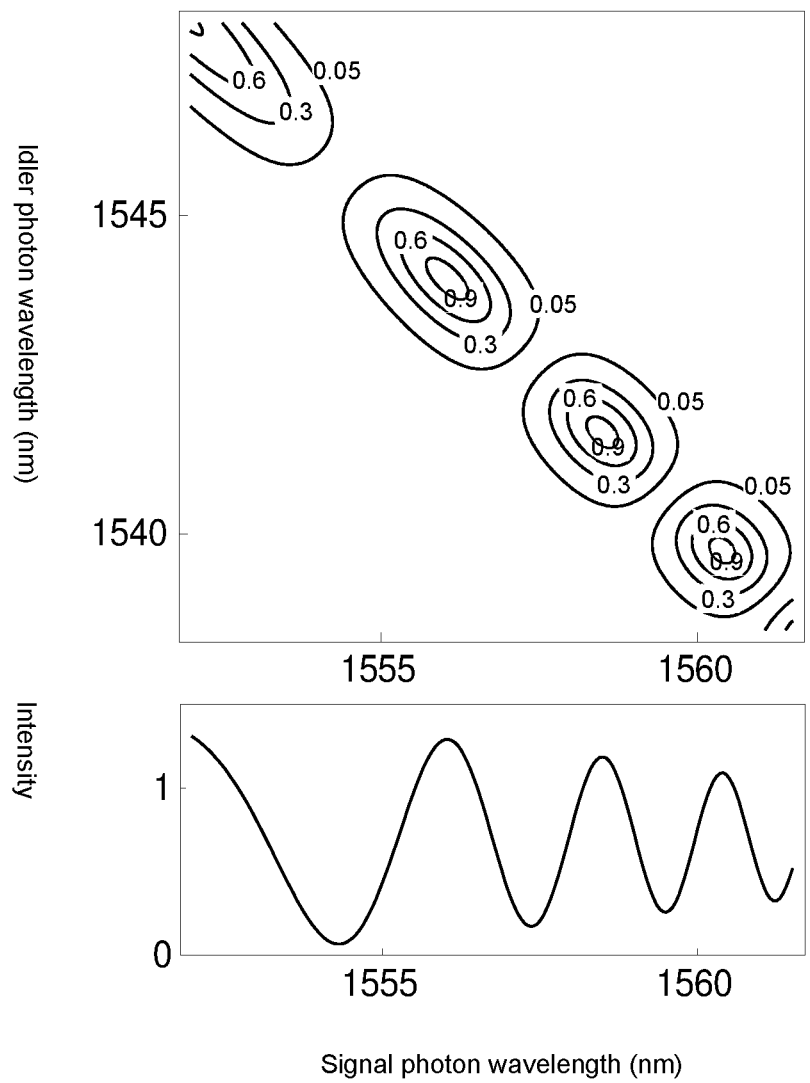
Figure 3C:
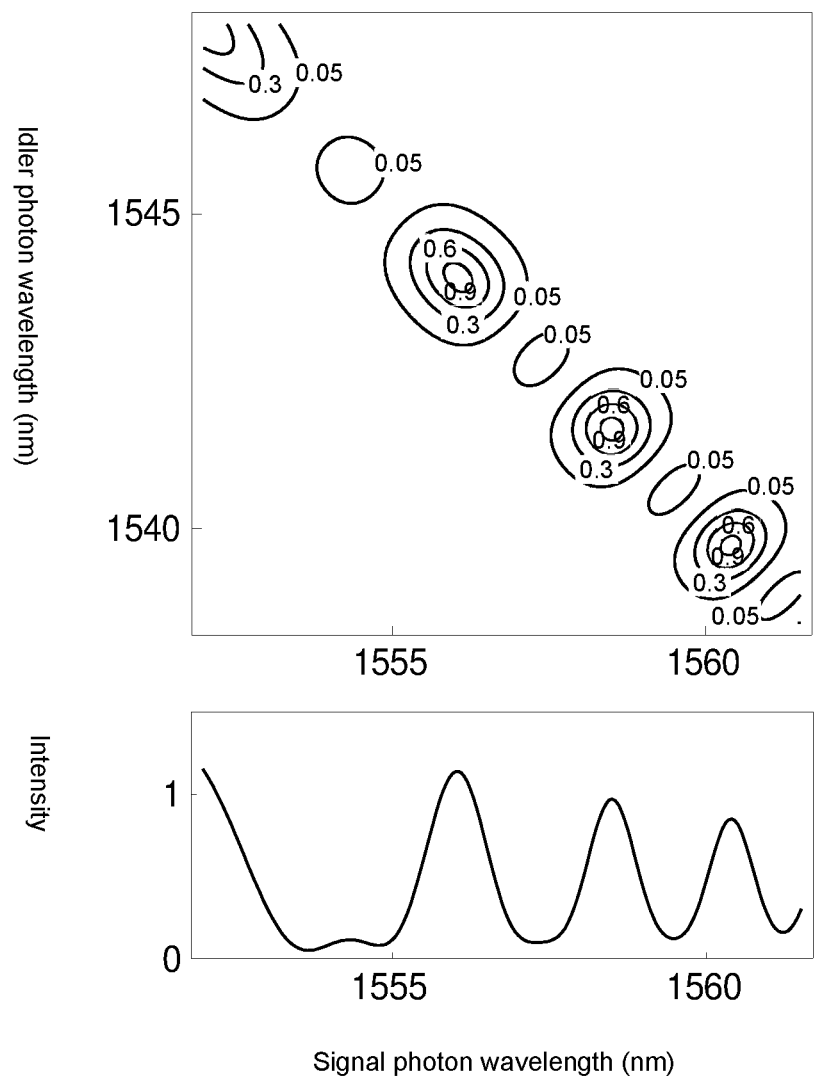
Figure 3D:
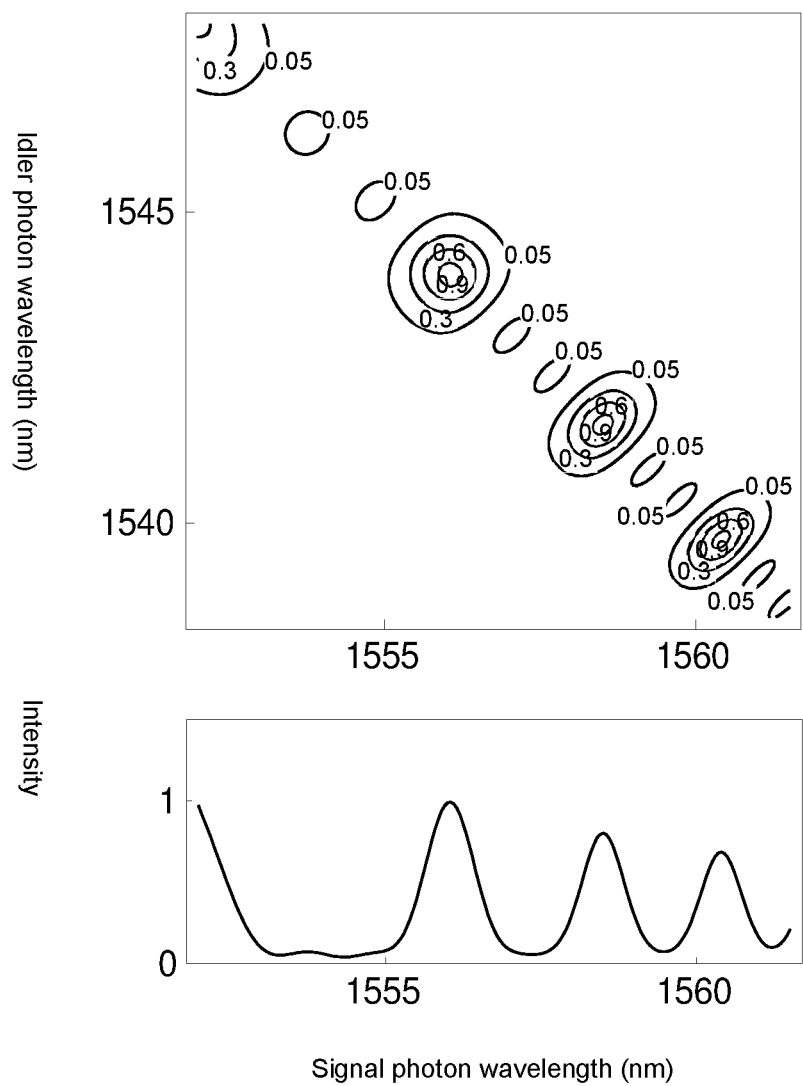

Embodiment 1: Generation of Spectral-Controllable Correlated Photon Pairs by Using Multi-Stage Cascaded Waveguide Structure Based on Dispersion-Shifted Optical Fibers and Single-Mode Optical Fibers In the present embodiment, as illustrated in FIG. 2, the nonlinear medium in the multi-stage cascaded waveguide structure (number of stages N≥3) is dispersion-shifted optical fiber, and the length and dispersion of each segment of the dispersion-shifted optical fiber are the same, the length is $L_U$=100 m, the zero dispersion wavelength is 1549 nm, the group velocity dispersion slope is 0.075 ps/km/(nm)$^2$; the dispersive medium in the multi-stage cascaded waveguide structure is telecom-band standard single-mode optical fiber, and the length and dispersion of each segment of single-mode optical fiber are the same, the length is $L_{dU}$=11 m, and the group velocity dispersion coefficient at 1550 nm is 20 ps/km/nm. Different segments of optical fibers are spliced sequentially. Pulsed pump light used for the cascaded waveguide structure has a standard Gaussian spectrum, the central wavelength is 1550 nm, the half maximum full width is 0.9 nm, and $\gamma P_p$ is 1 km$^{-1}$. Finally, the signal and idler photons generated in the cascaded structure are filtered out by using a multi-channel filter. The spectrum $|F_{NU}(\omega_s,\omega_i)|^2$ of the correlated photon pairs output from the cascaded waveguide structure under different parameters can be obtained through calculation by substituting the above parameters into equation (5) and equation (6).

The main calculation results in the present embodiment are illustrated in FIG. 3 (a) to FIG. 3 (d). In the calculation, it has been assumed that both optical fiber loss and splicing loss are zero, and the results have been normalized. FIG. 3 (a) is the spectrum of correlated photon pairs output from a single 100 m segment of dispersion-shifted optical fibers without using the multi-stage cascaded waveguide structure. FIG. 3(b) is the spectrum of correlated photon pairs output from a two-stage cascaded waveguide structure when N=2. FIG. 3(c) and FIG. 3 (d) are respectively spectra of correlated photon pairs output from a three-stage cascaded waveguide structure (N=3) and a four-stage cascaded waveguide structure (N=4) after the present invention is adopted. For FIG. 3 (a) to FIG. 3 (d), the upper half of each chart is a two-dimensional contour map of the joint spectral function $|F_{NU}(\omega_s,\omega_i)|^2$ of correlated photon pairs, the coordinate axis in the chart has been transformed from signal (idler) photon frequency $\omega_{s(i)}$ to signal (idler) photon wavelength $\lambda_{s(i)}$; and the lower half of the chart is the spectrum of one-dimensional signal photons obtained by projecting $|F_{NU}(\omega_s,\omega_i)|^2$ to the coordinate axis of signal photon wavelength.

From FIG. 3 (a) to FIG. 3 (d), it can be seen that, after the cascaded waveguide structure is adopted, the spectrums of photon pairs have a pattern of separate islands due to the constructive and destructive periodic quantum interference effect. The central wavelengths of the signal (idler) photons corresponding to the three island structures are respectively 1556.0 nm (1544.0 nm), 1558.5 nm (1541.6 nm) and 1560.4 nm (1539.7 nm). From FIG. 3(c) and FIG. 3 (d), it can be seen that, after the multi-stage (N≥3) cascaded waveguide structure in the present invention is adopted, the visibility of the interference of the output spectrum is enhanced (when comparing the spectra of the one-dimensional signal photon), and the separation of the island pattern is more obvious, i.e., the degree of isolation by the multi-stage cascaded waveguide structure as an active filter to adjacent channels increases with the order, which means higher collection efficiency. In addition, the width and shape of each island pattern can be controlled by changing the number of stages, and thus the control of the spectrum is more flexible.

An island pattern with a central wavelength of 1558.5 nm (1541.6 nm) for signal (idler) photons in FIG. 3 (c) is investigated. Based on its central wavelength, rectangular multi-channel filters with a bandwidth of 2 nm are respectively applied in the signal and idler photon channels to respectively filter the signal and idle photons. The calculated second order correlation function of the signal light field is $g^{(2)}=1.92$ and the collection efficiency is $\eta_s\eta_i=0.95$, which are respectively close to the single-mode light field ($g^{(2)}=2$) and the ideal collection efficiency ($\eta_s\eta_i=1$).

An island pattern with a central wavelength of 1556.0 nm (1544.0 nm) for signal (idler) photons in FIG. 3 (d) is investigated. Based on its central wavelength, rectangular multi-channel filters with a bandwidth of 2 nm are respectively applied in the signal and idle photon channels to respectively filter out the signal and idle photons. The calculated second order correlation function of the signal light field is $g^{(2)}=1.95$ and the collection efficiency is $\eta_s\eta_i=0.93$, which are respectively close to the single-mode light field and the ideal collection efficiency.

In conclusion, the multi-stage cascade structure can change the spectral properties of the correlated photon pairs, and by cooperating with the corresponding filters, higher mode purity close to that of single mode and collection efficiency close to ideal collection efficiency can be obtained. Moreover, by changing the number of stages of the cascaded waveguide structure and the length of the dispersive medium, the spectral properties of the correlated photon pairs can be tuned.

Figure 4:
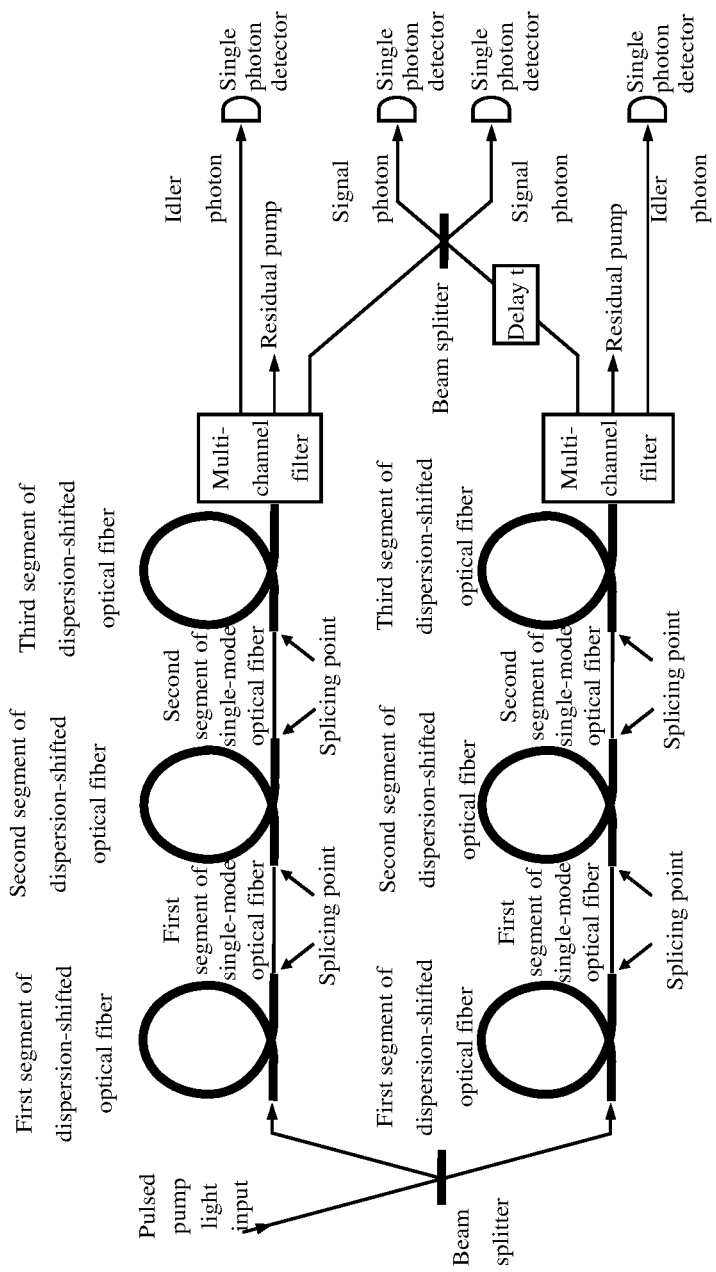
FIG. 4 is a schematic diagram of quantum interference between two independent predictive quantum pure state single photon sources based on cascade structures.

Embodiment 2: Quantum Interference Between Two Independent Heralded Pure State Single Photon Sources Based on Multi-Stage Cascaded Waveguide Structure Quantum interference between independent single photon sources is the basis of many quantum information technologies. As illustrated in FIG. 4, the two independent heralded single photon sources in the present embodiment are based on a three-stage cascaded waveguide structure consisting of dispersion-shifted optical fibers and single-mode optical fibers, and the structural parameters are the same as that in Embodiment 1. In the two heralded single photon sources, the length and dispersion of each segment of dispersion-shifted optical fibers are the same as that in Embodiment 1, the length is 100 m, the zero dispersion wavelength is 1549 nm, and the group velocity dispersion slope is 0.075 ps/km/(nm)$^2$; the length and dispersion of each segment of single-mode optical fiber are the same, the length is 11 m, and the group velocity dispersion coefficient at 1550 nm is 20 ps/km/nm. Different segments of optical fibers are sequentially spliced. Pulsed pump light used for pumping the cascaded waveguide structure has a standard Gaussian spectrum, the central wavelength is 1550 nm, the half maximum full width is 0.9 nm, and $\gamma P_p$ is 1 km$^{-1}$. The central wavelength of the signal photon channel of the rectangular multi-channel filter is 1558.5 nm, the central wavelength of the idler photon channel is 1541.6 nm, and the bandwidth of the two channels is 2 nm.

The two heralded single photon sources use the detection signals of idler photons to herald the existence of signal photons, thus projecting the signal photons to a single photon state. In the quantum interference device illustrated in FIG. 4, the idler photons from the two single photon sources are respectively detected directly by two single photon detectors, the output signal photons pass through two input ports of a beam splitter, the two outputs of the beam splitter are detected by two single photon detectors, and a time delay of t is introduced to the signal photons from one source through a delay device. Quantum interference patterns can be obtained by measuring the four-fold coincidence counts of the four single photon detectors as a function of the delay time t. Under the above parameter setting, according to the calculation results in embodiment 1 (signal light field $g^{(2)}=1.92$, collection efficiency $\eta_s\eta_i=0.95$), the corresponding quantum interference visibility V=92%.

Figure 5:
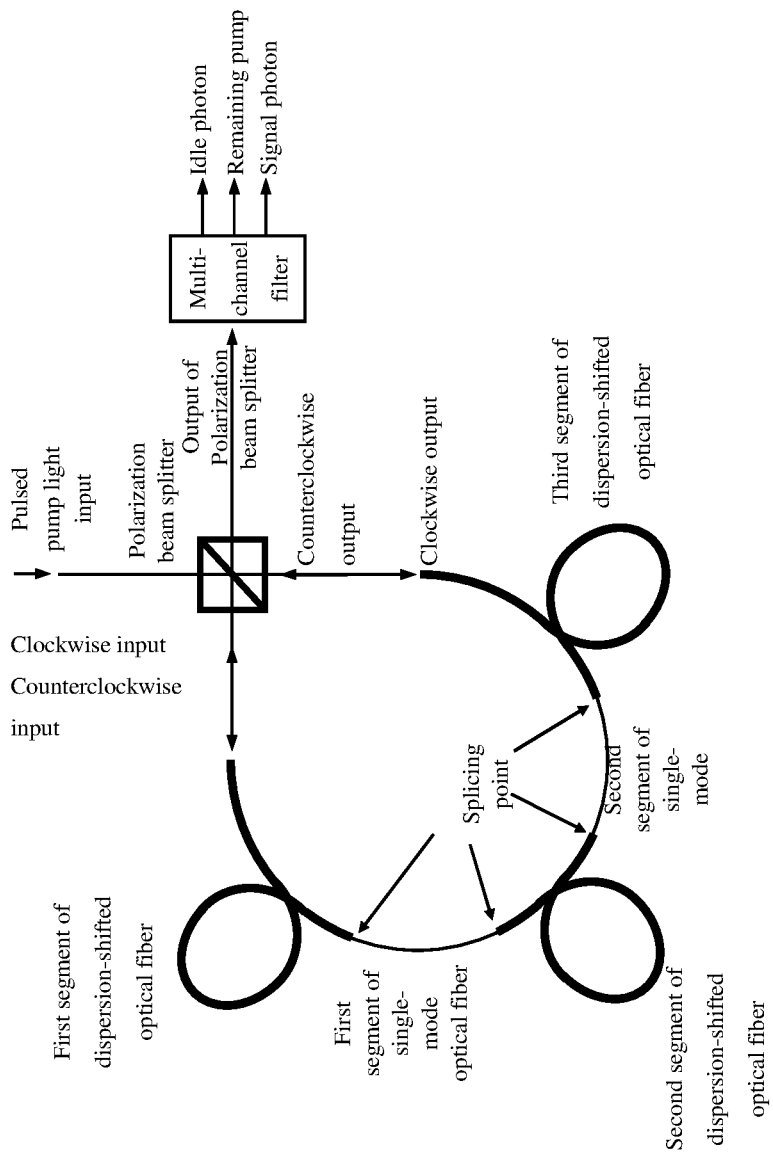
FIG. 5 is a schematic diagram of preparing polarization-entangled photon pairs based on multi-stage cascade structures.

Embodiment 3: Preparation of Polarization-Entangled Photon Pairs Based on Multi-Stage Cascaded Waveguide Structure As illustrated in FIG. 5, the present embodiment generates polarization-entangled photon pairs by using a bi-directionally pumped three-stage cascaded waveguide structure. The cascaded waveguide structure parameters, pump parameters and multi-channel filter in FIG. 5 are the same as the corresponding parameters in embodiment 2 illustrated in FIG. 4. Pulsed pump light is incident into a polarization beam splitter in a 45° linear polarization direction and is divided into a beam with a polarization direction parallel to a paper surface and a beam perpendicular to the paper surface. The beam with the polarization direction parallel to the paper surface is clockwise input to the three-stage cascaded waveguide structure, and signal and idler correlated photon pairs (expressed as $|H\rangle_s|H\rangle_i$) with the same polarization direction as the pump light are generated through the four-wave mixing process; after the beam with the polarization direction perpendicular to the paper surface is anticlockwise input to the three-stage cascaded waveguide structure, signal and idler correlated photon pairs (expressed as $|V\rangle|V\rangle_i$) with the same polarization direction as the pump light are generated through the four-wave mixing process. By controlling the polarization evolution introduced by the three-stage cascaded waveguide structure, the residual pump light and associated photon pairs output clockwise and counterclockwise, after converging at the polarization beam splitter, can be output from the same output port. Then the signal and idler photons are separated from the residual pump light by a filter. The signal and idler photons output from the filter are in a polarization-entangled state $|\Psi\rangle=|H\rangle_s|H_i\rangle+e^{i\varphi}|V\rangle_s|V\rangle_i$ ($\varphi=0$) due to the coherent superposition effect. On this basis, four Bell states of polarization entanglement can be obtained by controlling the phase difference φ.

Figure 6:
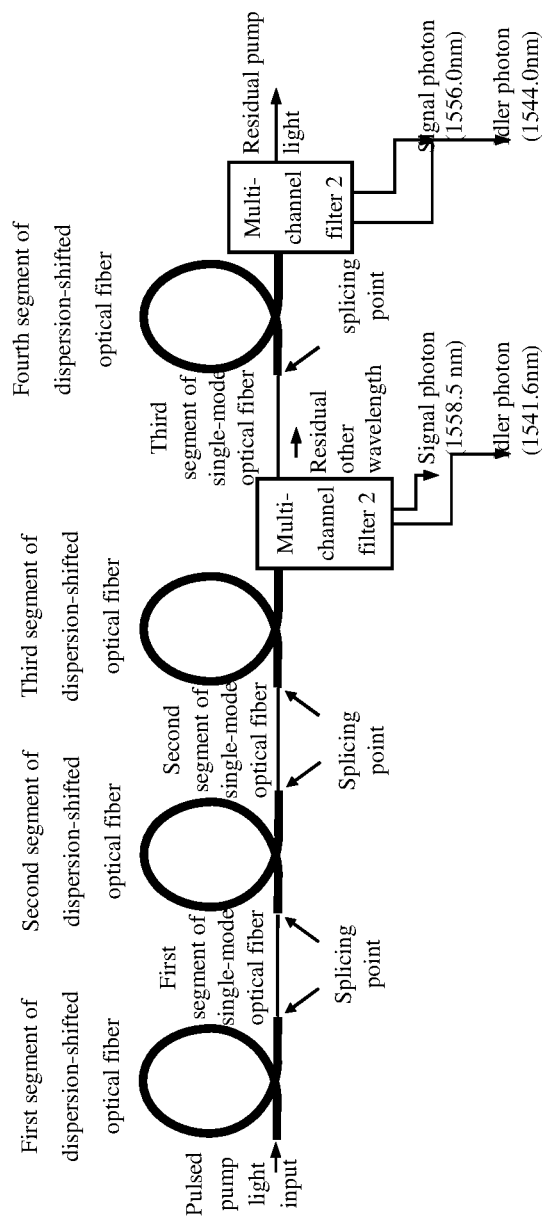
FIG. 6 is a schematic diagram of preparing two-output-channel predictive pure state single photons by using a two-stage cascade structure based on a waveform shaper.

Embodiment 4: Two-Channel Heralded Near-Pure State Single Photon Source Based on Multi-Stage Cascaded Waveguide Structure In the present embodiment, as illustrated in FIG. 6, the cascaded waveguide structure parameters and pump parameters in FIG. 6 are the same as the corresponding parameters in embodiment 1. In the present embodiment, a multi-channel filter 1 is added after the third segment of the dispersion-shifted optical fiber. The central wavelengths of the two rectangular filter channels of the filter are respectively 1558.5 nm and 1541.6 nm, the bandwidth is 2 nm, the corresponding signal photons and idler photons can be respectively filtered to form a first output channel, and the remaining wavelengths are output from another output port to the third segment of single-mode optical fiber. A multi-channel filter 2 is added after the fourth segment of the dispersion-shifted optical fiber, the center wavelengths of the two rectangular filter channels of the filter are respectively 1556.0 nm and 1544.0 nm, the bandwidth is 2 nm, and the corresponding signal photons and idler photons can be respectively filtered to form a second output channel. Assuming that the multi-channel filter does not introduce dispersion, according to the calculation results in embodiment 1, it can be seen that the photon pairs output from the two output channels have high mode purity and announced efficiency. If the detection signal of idler photons is used to predict the existence of signal photons, a two-channel near-pure state single photon source can be prepared.

Figure 7A:
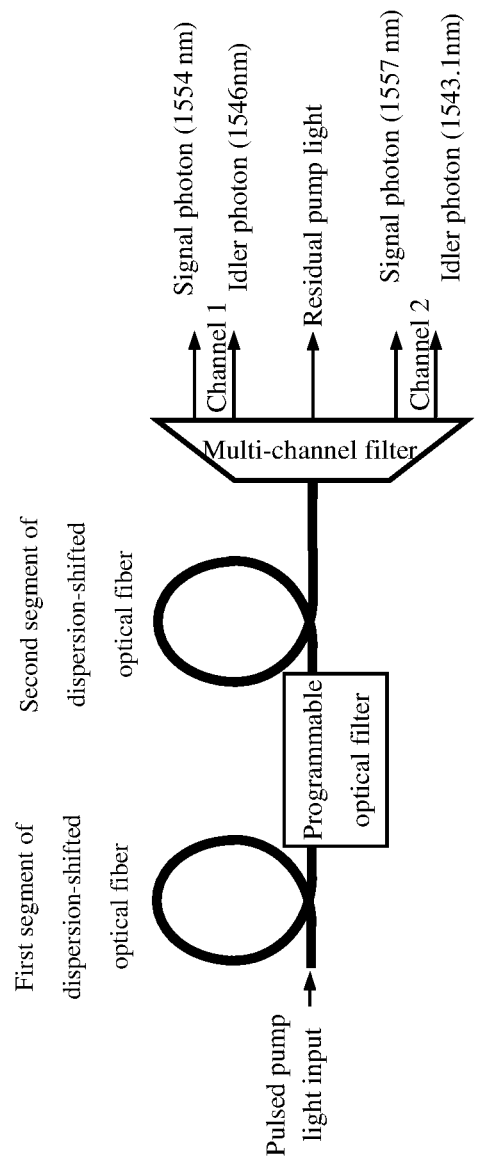
FIG. 7 (a) and FIG. 7(b) are schematic diagrams of preparing two-output-channel predictive near-pure state single photons by using a two-stage cascade structure based on a waveform shape, and simulation result charts.

Embodiment 5: Preparation of Two-Channel
Heralded Near-Pure Single Photon by Using
Two-Stage Cascaded Waveguide Structure Based
on Programmable Optical Filter The device in the present embodiment is as illustrated in FIG. 7(a). The two-stage cascade structure consists of two segments of dispersion-shifted optical fibers and a programmable optical filter which can introduce arbitrary phase at arbitrary wavelength. The length and dispersion of two segments of dispersion-shifted optical fibers are the same, the length is 100 m, the zero-dispersion wavelength is 1549 nm, and the group velocity dispersion slope is 0.075 ps/km/$(nm)^2$. The pulsed pump light used for pumping the cascaded waveguide structure has a standard Gaussian spectrum. The central wavelength is 1550 nm, the half maximum full width is 0.7 nm, and $\gamma P_p$ is 1 $km^1$.

Figure 7B:

The following phase shift is introduced by controlling the programmable optical filter:

$$\phi(\lambda) = \begin{cases} a(\lambda - \lambda_{i2}) - 3\pi/4 & \lambda_{i2} - 0.5 \leq \lambda \leq \lambda_{i2} + 0.5 \\ \pi/2 & \lambda_{i2} + 0.5 \leq \lambda \leq \lambda_{i1} - 0.5 \\ -a(\lambda - \lambda_{i1}) - 3\pi/4 & \lambda_{i1} - 0.5 \leq \lambda \leq \lambda_{i1} + 0.5 \\ \pi/4 & 1550 - 1 \leq \lambda \leq 1550 + 1 \\ a(\lambda - \lambda_{s1}) - 3\pi/4 & \lambda_{s1} - 0.5 \leq \lambda \leq \lambda_{s1} + 0.5 \\ \pi/2 & \lambda_{s1} + 0.5 \leq \lambda \leq \lambda_{s2} - 0.5 \\ -a(\lambda - \lambda_{s2}) - 3\pi/4 & \lambda_{s2} - 0.5 \leq \lambda \leq \lambda_{s2} + 0.5 \\ 0 & \text{others} \end{cases} \quad (8)$$

where $\lambda_{s1}=1554$ nm and $\lambda_{i1}=1546$ nm are respectively the signal and idler photon wavelengths of channel 1; $\lambda_{s2}=1557$ nm and $\lambda_{i2}=1543.1$ nm are respectively the signal and idler photon wavelengths of channel 2; and the coefficient a is 1.7 $nm^{-1}$. By introducing the phase shift mentioned above in equation (7), the joint spectral function of the corresponding correlated photon pairs can be obtained. The calculated two-dimensional contour map of the joint spectral function is as illustrated in FIG. 7(b), from which we can see two island structures respectively corresponding to two output channels. In the present embodiment, the multi-channel rectangular filter illustrated in FIG. 7 (a) is used to respectively output the signal and idle photons of the two channels, and the bandwidth of each channel is 2 nm. For the two output channels, it can be obtained through calculation that the signal (idle) field is $g^{(2)}=1.96$ and the collection efficiency is $\eta_s\eta_i=0.98$. Therefore, the photon pairs of the two output channels have high mode purity and collection efficiency. If the detection signal of idle photons is used to herald the existence of signal photons, a two-channel near-pure state single photon source can be prepared. In addition, equation (8) can be extended and rewritten to prepare a multi-channel near-pure single photon source.

The present invention is not limited to the embodiments described above. The above description of the specific embodiments is intended to describe and state the technical solution of the present invention. The above specific embodiments are merely exemplary rather than restrictive. Without departing from the essence and the scope of protection of the present invention, one skilled in the art may also make many specific transformations under the inspiration of the present invention, which, however, shall fall within the scope of protection of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for controlling spectral properties of optical quantum states using quantum interference in cascaded waveguide structure, comprising the following steps:

adopting a multi-stage cascaded waveguide structure sequentially consisting of a segment of nonlinear medium, a segment of dispersive medium, and a segment of nonlinear medium, or adopting a two-stage cascaded waveguide structure sequentially consisting of a segment of nonlinear medium, a segment of dispersion-controllable dispersive medium and a segment of nonlinear medium;

wherein the nonlinear medium and the dispersive medium in the multi-stage cascaded waveguide structure are sequentially and alternately arranged, and each segment of nonlinear medium is regarded as a stage, the number of stages of the multi-stage cascaded waveguide structure is greater than or equal to two;

both the nonlinear media and dispersive media have waveguide structure; light waves can be incident from one end of the multi-stage cascaded waveguide structure, or the two-stage cascaded waveguide structure and can be emergent from the other end to form a light wave path;

pumping the multi-stage cascaded waveguide structure or two-stage cascaded waveguide structure by using pulsed laser to generate optical quantum states including correlated photon pairs through a cascaded parametric process in the cascaded waveguide structure, wherein due to a quantum interference effect in the cascaded parametric process, the intensity of the optical quantum states experiences constructive or destructive interference at different wavelengths;

for the multi-stage cascaded waveguide structure, the wavelengths corresponding to constructive or destructive interference can be tuned by changing the number of stages of the multi-stage cascaded waveguide structure and the length of the dispersive medium or replacing the dispersive medium with different dispersion properties; for the two-stage cascaded waveguide structure, the wavelengths corresponding to constructive and destructive interference can be tuned by changing the dispersion properties and length of the dispersion-controllable medium; and filtering and collecting the optical quantum states at the wavelength corresponding to constructive interference by using filtering and collecting devices.

2. The method of claim 1, wherein the nonlinear medium in the multi-stage cascaded waveguide structure or two-stage cascade structure is a waveguide medium satisfying the phase matching conditions of the nonlinear parametric process; each segment of the nonlinear medium has the same or different dispersion properties, and when each segment of the nonlinear medium has different dispersion properties, it is required that the wavelength ranges of optical quantum states generated through the parametric process in each segment of nonlinear medium are overlapped.

3. The method of claim 1, wherein the dispersive medium in the multi-stage cascaded waveguide structure is a waveguide structure medium with dispersion; and the dispersion-controllable medium in the two-stage cascaded waveguide structure is a waveguide medium or device with dispersion controllability.

* * * * *